(12) United States Patent
Lee

(10) Patent No.: US 8,103,722 B2
(45) Date of Patent: Jan. 24, 2012

(54) ENDPOINT STATUS NOTIFICATION SYSTEM

(75) Inventor: Eng-Keong Lee, Chandler, AZ (US)

(73) Assignee: Inter-Tel, Inc., Tempe, AZ (US)

( * ) Notice: Subject to any disclaimer, the term of this patent is extended or adjusted under 35 U.S.C. 154(b) by 1422 days.

(21) Appl. No.: 10/696,148

(22) Filed: Oct. 29, 2003

(65) Prior Publication Data

US 2005/0108348 A1   May 19, 2005

(51) Int. Cl.
    *G06F 15/16* (2006.01)
(52) U.S. Cl. .................. 709/206; 709/202; 709/204
(58) Field of Classification Search .................. None
    See application file for complete search history.

(56) References Cited

U.S. PATENT DOCUMENTS

| | | | |
|---|---|---|---|
| 3,651,270 A | | 3/1972 | Lee, Jr. et al. |
| 5,742,668 A * | | 4/1998 | Pepe et al. ............ 455/415 |
| 6,301,609 B1 | | 10/2001 | Aravamudan et al. |
| 6,317,485 B1 * | | 11/2001 | Homan et al. ........... 379/88.12 |
| 6,501,834 B1 | | 12/2002 | Milewski et al. |
| 6,519,639 B1 | | 2/2003 | Glasser et al. |
| 6,539,421 B1 * | | 3/2003 | Appelman et al. ......... 709/206 |
| 6,553,341 B1 * | | 4/2003 | Mullaly et al. ............ 704/9 |
| 6,757,365 B1 * | | 6/2004 | Bogard .............. 379/88.17 |
| 6,912,564 B1 * | | 6/2005 | Appelman et al. ......... 709/204 |
| 7,043,530 B2 * | | 5/2006 | Isaacs et al. ............ 709/206 |
| 2002/0034281 A1 * | | 3/2002 | Isaacs et al. ............ 379/88.12 |
| 2003/0046134 A1 * | | 3/2003 | Frolick et al. ............ 705/8 |
| 2003/0046296 A1 | | 3/2003 | Doss et al. |
| 2003/0174815 A1 | | 9/2003 | Didcock et al. |
| 2004/0196963 A1 * | | 10/2004 | Appelman et al. ........ 379/88.12 |
| 2004/0199581 A1 * | | 10/2004 | Kucharewski et al. ...... 709/204 |
| 2004/0199582 A1 * | | 10/2004 | Kucharewski et al. ...... 709/204 |
| 2004/0267625 A1 * | | 12/2004 | Feng et al. ............. 705/26 |

FOREIGN PATENT DOCUMENTS

EP   1345397 A1   9/2003

* cited by examiner

*Primary Examiner* — John B. Walsh
(74) *Attorney, Agent, or Firm* — Michelle Whittington, Esq.

(57) ABSTRACT

The endpoint status notification system includes an address book of network user's names and their associated endpoints. A user selects a personal list of contacts from the address book and receives an instant message alert upon every occurrence of a reportable event for one of the contacts on the list. Alerts are informational status messages pertaining to the contact and are delivered unbeknownst to the contact. Preferably, alerts are popup windows displayed for a preset amount of time, however audible alerts are available in lieu of or in combination with the popups. Reportable events are selected by the user for each of the contacts on the list and may differ from contact to contact. Simultaneous with the alert, the user may be provided a call-control option related to the reportable event and pertaining to the contact. If selected, the call-control option causes a telecommunication function to immediately occur.

16 Claims, 8 Drawing Sheets

ENDPOINT STATUS NOTIFICATION SYSTEM

FIELD OF INVENTION

The present invention relates generally to endpoint status and, in particular, to a status notification system of a group of communications endpoints.

BACKGROUND OF THE INVENTION

In the 1970s, very basic messaging capabilities to customer-owned Private Branch Exchange (PBX) systems was introduced. For instance, a switchboard attendant delivered a signal to a telephone, e.g., in a hotel room, causing a lamp mounted on the telephone to illuminate. This technique was used to inform the guest that there was a message waiting or to remind the guest that are unavailable for incoming calls by placing their telephone in a Do-Not-Disturb (DND) mode. The status information provided was limited to what could be conveyed with a flashing light initiated by the system's attendant and only provided the status of the user and not the status of others.

With the introduction of Instant Messaging ("IM") technologies in the late 1990's, computer users were able to monitor the "on/off" status of other users, typically users within a particular "buddy list." Initially, the devices serviced by IM were limited to fixed computers. However, in recent years, a wider variety of communication devices have been adapted to IM including, mobile telephones, personal digital assistants (PDAs), and pagers. For example, U.S. Pat. No. 6,301,609 issued to Aravamudan et al., discloses a variety of devices available for use with an IM server. In the Aravamudan system, the user assigns priority levels to buddies as a way of maintaining control of the user's privacy with respect to his online location, presence, and activities. A buddy who is assigned a high priority may be notified of the user's "real presence" when the user accesses the network via any of his provisioned devices, while lower priority buddies can only discern the presence of the user's proxy. The Aravamudan system only provides the user and buddies with information on whether the buddy is logged on or off the network and with which device. Detailed status information concerning the network users is not provided.

U.S. Patent Publication No. 2003/017485 discloses a unified messaging server in combination with an IM server whereby upon receipt of a telephone call an IM session can be initiated. The subscriber responds to the screen-pop instant message and accepts the call, rejects the call, or transmits a text message to the caller. The disclosed system provides calling party information to the subscriber but only at the time a call is placed and only about that particular call. Detailed status information concerning the network users is not provided.

U.S. Pat. No. 6,519,639 issued to Glasser et al. discloses an activity notification system that uses a timer to detect user operation of an input device occurring within a predetermined time interval. Activity messages are sent to other participants in an IM session at the end of each time interval (e.g., five seconds) to indicate a user is actively communicating. However, if a user's device is inactive at the end of the time interval, no messages are sent to indicate the non-active status. Thus, if a participant changes status more than once during the predetermined time interval, only the last status will be recognized. Additionally, the only information concerning participants provided to users is an activity detection notification. Instantaneous detailed status information concerning the network users is not provided.

Other IM systems incorporate information from the user's electronic calendar to update contact information. For example, U.S. Publication No. 2003/0046296 discloses automatically updating contact information for each name in a buddy list by retrieving information from each buddy's electronic calendar. Display icons next to the names in the buddy list may change color or type to indicate the buddy's status. To retrieve more detailed information about an entity, the user moves the cursor over a particular icon or name and pertinent information is displayed. Detailed status information is made available in the user's buddy list, but is not provided automatically to the network users.

Thus, it would be desirable to receive instantaneous detailed status information concerning network users and preferably a selected group of network users and endpoint devices. An endpoint status notification system is needed that provides immediate status notifications concerning network users, such as with an instant message-type alert. Moreover, it would be advantageous to provide the recipient of the status notification a way to immediately respond to the update. Additionally, a status notification system is needed that permits the user to selectively control the level of status information received for each network user and/or endpoint in the communication group.

SUMMARY OF THE INVENTION

An endpoint status notification system in accordance with various aspects of the invention generally includes an address book having the network user's names and their associated endpoints. A user of the system selects a personal list of contacts from the address book that he wishes to receive status notifications on and selects the reportable events for each contact, whereby the reportable events may differ for each of the contacts. Upon every occurrence of a reportable event pertaining to one of the contacts, the system sends an instant message alert to the user unbeknownst to the contact. Simultaneous with the instant message alert, the system sends a call-control option and, if selected by the user, causes a telecommunication function related to the reportable event and pertaining to the contact to immediately occur.

In one embodiment, the instant message alert is a popup window on a display of the user's endpoint.

In another embodiment, the instant message is an audio alert sound.

In yet another embodiment, the personal list of contacts includes a textual display of the current status of the contacts. The list is viewable by the user and updated immediately following a reportable event, whereby the user is able to view a real-time status of the contacts.

A method of endpoint status notification system in accordance with the various aspects of the invention generally includes selecting a list of personal contacts from an address book comprising the names and endpoints belonging to the users. For each of the contacts, choosing one or more telephony-related reportable events associated with the contact, whereby the reportable events for each contact may differ. A message alert is received instantaneously upon occurrence of the telephony-related reportable event and transmitted unbeknownst to the contact. The viewable alert includes an informational message and a call-control option, both pertaining to a real-time status of one of the contacts. A selection of a call-control option initiates a telephony-related function to the contact.

Another method for status notification in a telecommunications network having a plurality of endpoints generally includes detecting a change in status of a monitored endpoint, and determining if the change is an identified reportable event for the monitored endpoint. If the change is an identified reportable event, then immediately transmitting a status alert to a user requesting notification of the identified reportable event. Simultaneous with the status alert, transmitting one or more call processing commands related to the identified reportable event and the monitored endpoint, and processing a call command associated with the monitored endpoint.

In an embodiment of the status notification method, determining includes comparing the change to a pre-selected and stored reportable event for the monitored endpoint.

In another embodiment, the reportable events vary for each monitored endpoint.

BRIEF DESCRIPTION OF THE DRAWINGS

These and other features, aspects, and advantages of the present invention may be best understood by reference to the following description taken in conjunction with the accompanying drawings, wherein like reference numerals indicate similar elements.

DETAILED DESCRIPTION

The present invention provides an improved system and method for endpoint status notification by, for example, issuing popup alert windows to users within a selected group. The alerts are configured to automatically display on a user's screen when a change in status occurs for a monitored endpoint. The user can assign the reportable events for each endpoint/user that will trigger an alert. Additionally, when a popup alert is displayed, the user may be provided a selection of call-control options to immediately respond to the endpoint/user, if desired. The particular details of an endpoint status notification system and methods will follow, to include a preferred embodiment and best mode.

Figure 1:
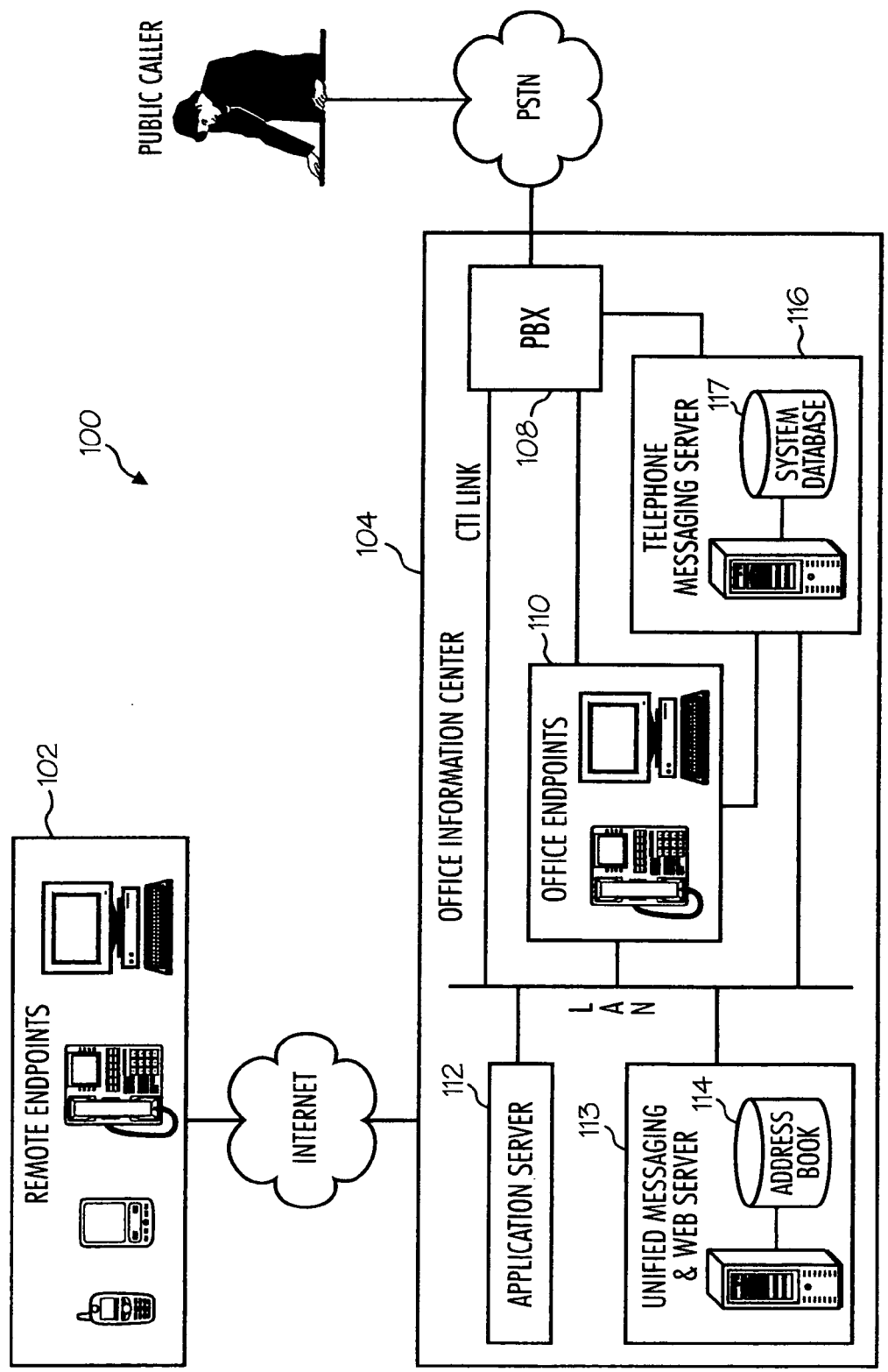
FIG. 1 illustrates an exemplary endpoint status notification system in accordance with various embodiments of the invention.

FIG. 1 illustrates an exemplary endpoint status notification system 100 in accordance with various embodiments of the invention. Exemplary network or system 100 includes an office information center 104. Office information center 104 generally includes a PBX system 108 (private branch exchange), one or more office endpoints 110, an application server 112, a unified messaging and web server 113, and a telephone messaging server 116. In addition, office information center 104 may include any necessary connections, data routing facilities, ancillary apparatus, network infrastructure, and the like normally associated with a business entity. In the illustrated embodiment, a LAN (local area network) interconnects the office information center and facilitates coupling to outside connections and a CTI link connects PBX 108 to the LAN.

Used herein, "endpoints" may include telephones (stationary and portable), keysets, personal computers, computing devices, personal digital assistants, pagers, wireless remote clients, messaging devices, and any other communication device capable of transmitting and receiving communication signals. Preferably, the endpoint includes an input or control means and a display.

Office information center 104 includes one or more office endpoints 110. In one particular embodiment, office endpoint 110 is an office workstation associated with a keyset. The office workstation may include a computing device, such as a stationary or portable personal computer having a memory, database, display and input means. The workstation is preferably coupled to the keyset (e.g., a multi-function desktop telephone) so communication and status information is available on either unit. While a user is in the office, office endpoint 110 may be in communication with various other systems within office information center 104. For example, each office endpoint 110 preferably has connectivity to PBX 108, TMS 116, and UMS 113.

In one particular embodiment, one or more remote endpoints 102 communicate with office information center 104. Remote endpoints 102 include the same types of endpoints as previously described, but typically are off-site or remotely located from office information center 104. Examples of remote endpoints include, but are not limited to, cellular phones, PDAs (personal digital assistants), personal computers, keysets, and other devices that may be adapted to take calls and messages when users are away from the office. Preferably, remote endpoints 102 include a display, input or control means, and a web or microbrowser with suitable hardware and/or software to effectuate connection to the Internet. It should be appreciated that, although not shown or described, additional connections, links, adapter interfaces and networks may occur between the remote endpoints, the Internet, and office information center.

As illustrated in the current embodiment of FIG. 1, the communication channel between the remote endpoints 102 and the office information center 104 is preferably the Internet, or the equivalent. In addition, the illustrated embodiment includes incoming and outgoing calls to office information center 104 received over a standard PSTN (public switched telephone network). In this manner, calls made to endpoints 110 or 102 over the PSTN may be received and routed by PBX 108.

PBX system 108, or the equivalent, may include various interfaces as needed for communication within the office information center, the Internet, the PSTN, and other wired or wireless networks. PBX systems are generally well known and provide telephone and messaging services as needed to multiple office users (i.e., endpoints). Provided services typically focus on the delivery of external and internal telephone calls to a commercial business. In general, PBXs are office-based telephone exchanges having special functions directed towards business users. Similarly, the PBX is any customer-owned switching apparatus that is used to connect real-time voice or multimedia communications from user-to-user (or endpoint-to-endpoint) regardless of the technology employed, such as time division multiplexing, packet switching, optical switching, or any combination thereof. Modern PBXs also provide integrated voice mail (e.g., in combination with telephone messaging server 116), hands free intercom calls, call center functions, complex system networks, and additional features using external computer control.

Application server 112 generally includes hardware and/or software to authenticate the user and maintain a partial directory service for the users. Additionally, application server 112 may include various other applications stored thereon used to facilitate connection, control, and retrieval of messages and other communication functions in accordance with the invention. In one aspect, application server 112 includes a directory service for the network users that may contain numbers and/ or devices that are not typically associated with the network, such as mobile numbers.

Telephone messaging server 116 (TMS) includes hardware and/or software configured to work in conjunction with PBX 108 for the management of communication messages. A system database 117 couples to TMS 116 for the storage of messages intended for users within a network. Database 117 also contains address directory information, such as names, telephone numbers, extensions, and contact information, for the users in the network.

Unified messaging and web server 113 (UMS) includes hardware and/or software configured to monitor events from endpoints, and manage and display messages for users within the network. UMS 113 is further configured to provide a visual description of messages (i.e., cause the display of the message's envelope) and similar functions on a display of an endpoint. In this manner, there is a communication link between UMS 113, TMS 116, application server 112 and PBX 108. The operations associated with a unified messaging server are generally known in the industry and therefore will not be discussed in detail. However, the particular details of the invention as it pertains to the UMS will be described.

UMS 113 provides web server capabilities for office information center 104. The web server presents readable data to endpoints typically in a web-page format. A typical web page may include HTML documents, various forms, Java applets, Javascript, active server pages (ASP), common gateway interface scripts (CGI), extensible markup language (XML), dynamic HTML, cascading style sheets (CSS), help applications, plug-ins, and the like. The preferred system and method of the present invention utilizes the Internet as an accessible and widely available communication channel to receive status notifications on users in a group. In this manner, any device that is capable of logging into a web page format as provided by the UMS can participate in the system.

UMS 113 includes an address book database 114. Address book 114 stores a unified listing of all devices or endpoints in the network (i.e., includes information from various sources, such as TMS 116 and application server 112. Initially, address book 114 may be populated with names, numbers and other information on file with PBX 108 and/or TMS 116. Each user may also have a personal address book or contacts list (i.e., storage) that they can fill with information from the PBX system directory or with personal contact information. In addition, users may set up personal address book entries for endpoints that are not directly connected to PBX 108. These types of endpoints include, but are not limited to, one or more remote endpoints 102 such as those previously described. As information is added to the address book more contact information is available to other users.

The particular operations of an endpoint status notification system, to include one preferred embodiment utilizing instant messaging-like alerts, will be discussed. It should be realized that the following description is not intended to be limiting but rather to provide a preferred embodiment and best mode.

As previously mentioned, each user may have access to a system address book. The address book may be displayed to the user on a suitable device and optionally, upon a successful log in. In addition to the address book, the user can create a subset of the address book or a "contacts list." The subset contains a group of contacts from the address book that are of interest to the user and may provide the user with a visual description of the real-time status of the contact. In accordance with the invention, the user may further create a subset of the contacts list that the user would like to receive instant status notifications on.

Figure 2:
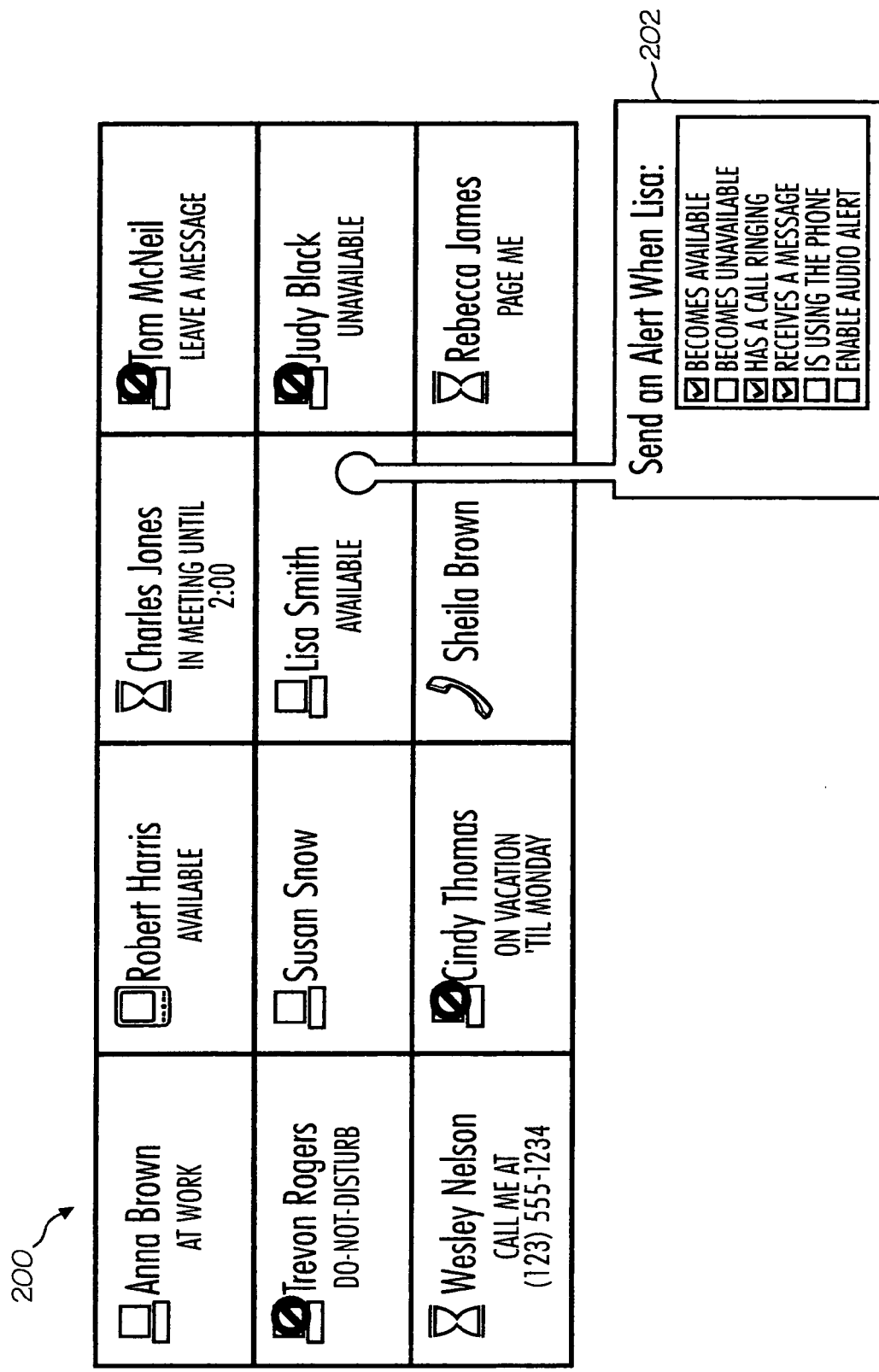
FIG. 2 illustrates an exemplary group of speed dial buttons in accordance with an embodiment of the invention.

Referring now to FIG. 2, an exemplary group 200 of speed dial buttons for a particular user is shown. Each button represents a contact selected from the address book and placed in the user's personal list of "speed dial contacts." In one particular embodiment, each button is a GUI (graphical user interface) speed dial button designed to behave like the familiar speed dial button on a standard telephone. The user may continue to create additional buttons by manually selecting designated names (contacts) from the user's personal contacts list or from the directory address book. Similarly, the user can remove speed dial buttons. An assembled array of twelve speed dial buttons is illustrated, however it should be realized that more or less buttons can be included.

Events associated with the contact represented by the speed dial button are monitored and reportable events are provided to the user. For example, at a glance, the user can view the real-time status of any contact in group 200. For example, contact "Trevon Rogers" is currently in a "Do-Not-Disturb" status and "Cindy Thomas" is "On Vacation 'Til Monday." Other contacts are "Available" as indicated by the text below the name or a blank button, such as contact "Susan Snow." The buttons may also include a status indicator represented as an "icon." For example, the handset icon next to "Sheila Brown" may indicate that her phone line is currently busy, the hourglass icon by "Charles Jones" may indicate that his account is unavailable, and the slashed circle icon may indicate that the device or account is currently in DND. In this manner, the user can determine the status of the contact by reading the textual status or by viewing the icon. Optionally, the user may move a mouse over the icon and "read" the icon representation. In another embodiment, the user can choose to "hide" the textual status and only view the icons. This latter option conserves screen space and may be particularly useful for large groups.

Each button can be activated, e.g., by a mouse click, by the user to perform a function specific to the contact, such as place a call or modify the reportable events. To place a call using the speed-dial button, the user may click on the button and select the appropriate number to call, provided that the contact has more than one number/device listed.

"Reportable events" are changes in status that trigger the system to send a status notification. There are generally two kinds of reportable events, those pertaining to/for the user, and those pertaining to/for a contact in the user's speed dial group. Referring now to window 202, an exemplary reportable event setup window for a speed dial contact in accordance with an embodiment of the invention is illustrated. Window 202 may be activated by the user, such as by a bright mouse "click," to choose the level of status reporting for each speed dial button contact. In the illustrated embodiment, window 202 is displayed for contact "Lisa Smith." The user can set the reportable events that trigger a notification to the user when Lisa's status changes. For example, the user may select to receive notice when Lisa has a call ringing. This particular feature may be particularly useful if the user is monitoring Lisa's phone calls, such as in a secretarial position. Every time one of Lisa's selected reportable events occurs, the user will receive a status notification. The user can set the reportable events for each speed dial button contact and may increase or decrease the level of reporting depending on the contact. Alternatively, the system may include default reportable events that trigger notifications, thereby relieving the user of individually choosing events for a particular contact or all of the contacts in the list. It should be realized that the reportable events illustrated and described are not intended to be limiting but are provided merely as examples to facilitate understanding of the disclosure. Indeed there are numerous reportable events that may be programmed for monitoring.

With continued reference to window 202, another aspect of the invention involves an audible type of status notification. For example, an endpoint status notification system of the invention generally provides an "alert" to the user when a reportable event has occurred. In a preferred embodiment, the alert includes an instant messaging-type alert. However, the instant message may include either a visual message or an audible message-type alert. Enabling an audio alert may be particularly useful when users are working in their office but not necessarily viewing a display. A suitable alert may sound when a reportable event occurs to notify the user, thus providing an alternative means to receive notification. This feature has further usefulness for visually-impaired users that may choose to hear their alerts rather than view them.

Figure 3:
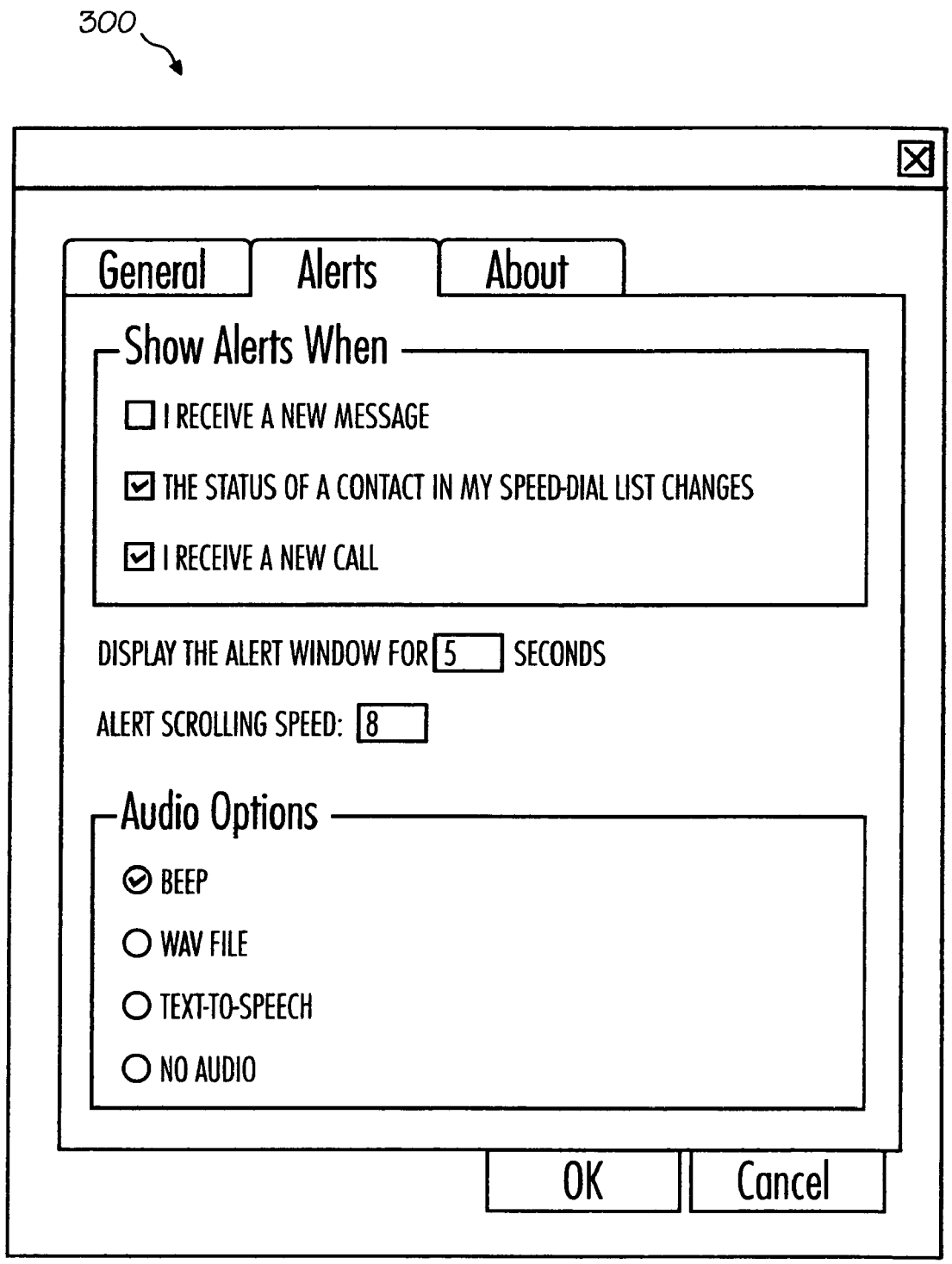
FIG. 3 illustrates an exemplary reportable event setup window in accordance with an embodiment of the invention.

Referring to FIG. 3, an exemplary reportable event setup window 300 for the user in accordance with an embodiment of the invention is illustrated. The user can set the reportable events for status changes pertaining to/for the user, as well as configure the general settings of the notifications from window 300. In this particular example, the "Alerts" tab is selected and permits the user to choose which reportable events to receive a status notification on. Another optional feature available to the user is how long the notification is displayed before disappearing. In this manner, the user can control what types of alerts he receives and how long they remain displayed. The user simply enables or disables a selection by clicking on the selection box or entering information. For example, the user may request an alert when a new station or voicemail message arrives, an incoming call is ringing, and/or the status of a contact in the user's speed dial list changes. It should be realized that similar to the reportable events available to the contacts lists, the reportable events illustrated and described for the user are not intended to be limiting but are provided merely as examples to facilitate understanding of the disclosure.

As previously mentioned, the alert may be in the form of an audio alert. Thus, the user may choose to view the alert, hear the alert, or a combination of both. With continued reference to window 300, exemplary audio options are illustrated. For example, when a reportable event occurs, the user may choose to hear a "beep" (e.g., a system beep), a pre-programmed sound, or the entire message (e.g., using text-to-speech technology).

The "General" tab of window 300 may be used to configure the general settings of the notifications and the system. For instance, the user may specify automatic login and/or confirmation prompts.

Figure 4:
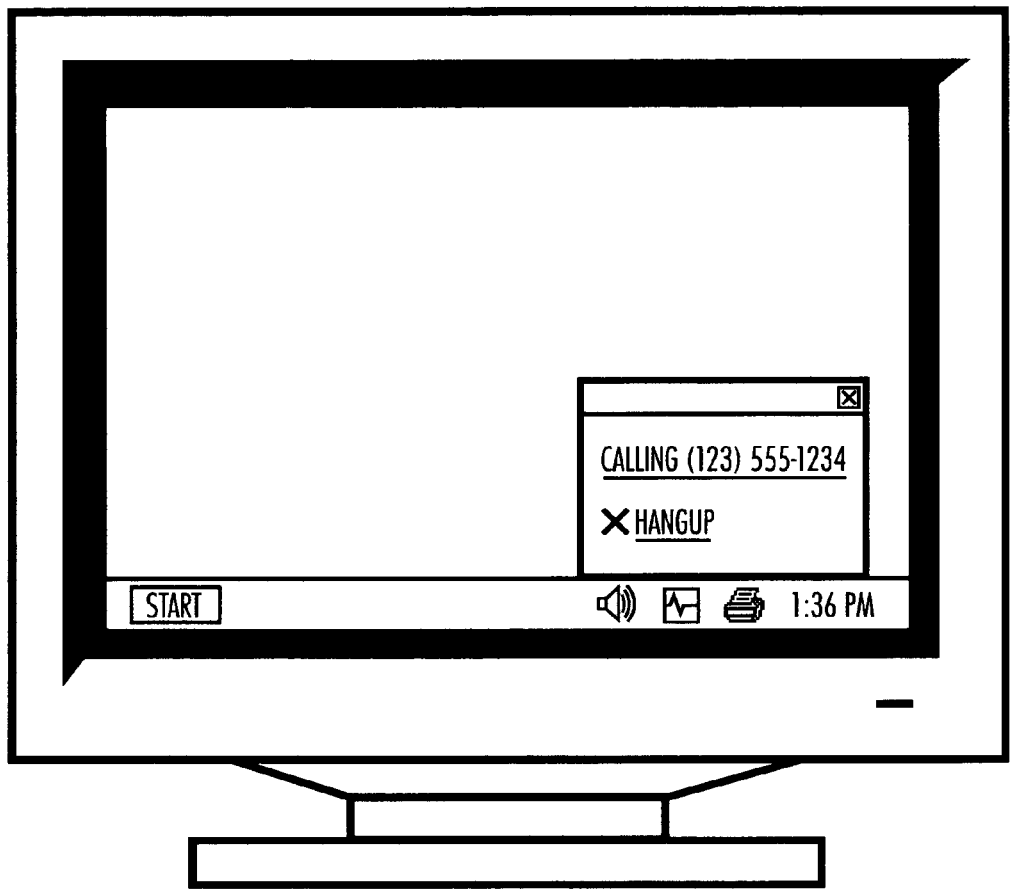
FIG. 4 illustrates an exemplary popup alert window for a personal computer embodiment in accordance with various aspects of the invention.

FIG. 4 illustrates an exemplary popup alert window for a particular embodiment of status notifications in accordance with the invention. In this particular embodiment, the user's device is a personal computer having a suitable screen display. In a preferred embodiment, a small window or popup scrolls onto the display from a system tray and contains information on a reportable event that has occurred. In general, the "tray" is visibly located at the outermost edge of a display screen and typically contains multiple system icons. It should be realized that the popup alert may appear elsewhere on the display, however it may be preferred to appear in a less intrusive manner, such as in a corner from the tray.

In the illustrated embodiment of FIG. 4, the popup alert window indicates the user has placed a call to number (123) 555-1234. Depending on the particular application utilizing the disclosed system, the user can dial the number on an associated keyset or may select the number from a softkey phone from the computer display. There are various methods of dialing numbers known in the telecommunications industry that are suitable for use with the inventive system.

FIGS. 5A-H illustrate exemplary popup alert windows displaying a variety of reportable events for a particular embodiment of status notifications in accordance with the invention. The alert window displays an informational message and can optionally include one or more options that the user can select to perform an action related to the alert. Once the alert has scrolled completely onto the display screen, it remains on the screen for the preset amount of time, then scrolls off the screen and disappears. If the user wants to remove the alert window quickly, the alert may include an optional "X" or the equivalent for the user to select and close the window. A review of the exemplary reportable events will follow, however it should be realized that the type of alert, style and display are not intended to be limiting. Various other alert contents and formats are contemplated and fall within the scope of a status notification system as disclosed.

Figure 5A:
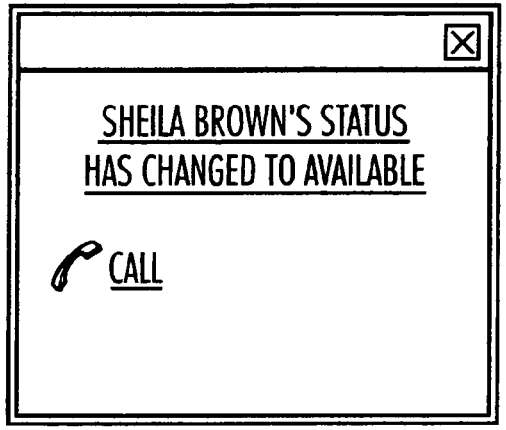
FIGS. 5A-H illustrate exemplary popup alert windows displaying a variety of reportable events in accordance with various embodiments of the invention.
Figure 5B:
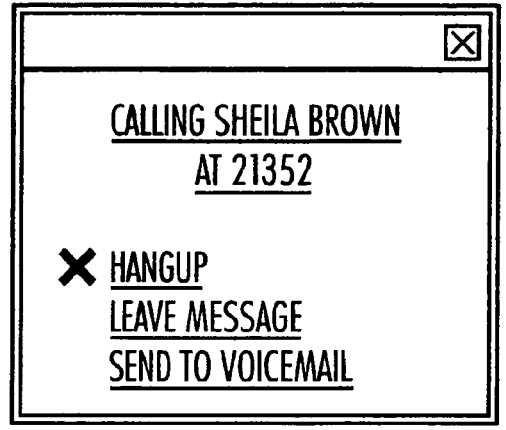

Recall that the user receives a system-generated status notification when a reportable event occurs and that the event can be for the user or a contact on the user's speed dial list. FIG. 5A illustrates a popup alert indicating, "Sheila Brown's status has changed to Available." With combined reference to FIG. 2, notice that Sheila's status icon is a handset and in this particular illustration represents her line is busy. Immediately after she terminates the current call, Sheila's status changes to available which, if set by the user as a reportable event, triggers a status notification. The user receives a status notification such as the popup alert of FIG. 5A due to Sheila's reportable event. In addition, the popup alert may include a call control function related to the event. The current embodiment includes a "Call" hotspot that when activated immediately places a call from the user to Sheila Brown's extension or number. Referring now to FIG. 5B, a popup alert indicating the user is calling Sheila Brown is illustrated. The user is further provided with call handling options only pertinent to the call to Sheila, such as hangup, leave a message, and leave a voicemail. It should be realized that depending on the user's device, the user may select the call handling option directly from the display screen or may perform the function directly on an associated telephone.

Figure 5C:
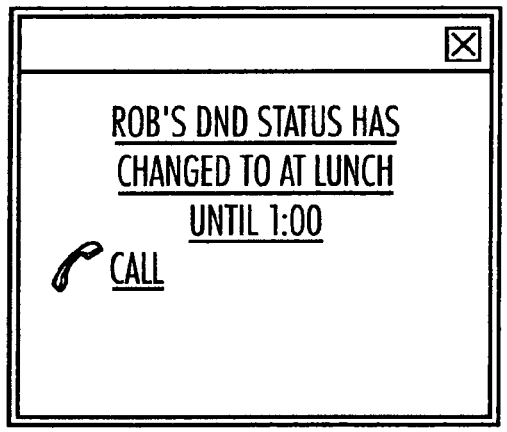

FIG. 5C illustrates yet another exemplary popup alert in accordance with the invention. In this notification, Rob's status changed to "At Lunch Until 1:00" and briefly appeared on the user's display. The user may be provided certain options such as to call Rob. Of course, if the user selects the call option and places a call to Rob's endpoint, a popup alert similar to FIG. 5B will appear on the user's display with various call handling options.

Figure 5D:
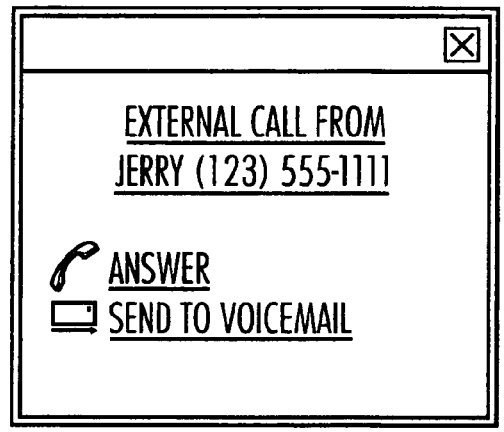

As previously mentioned, reportable events to/for the user can trigger a status notification. FIG. 5D illustrates a popup alert indicating that an external call (such as from outside a particular network) is coming in to the user. In this particular illustration, a call from "Jerry" at number "(123) 555-1111" is ringing. The user is provided with several call handling options that can be selected directly from the display screen or, depending on the device, from an associated telephone.

In one embodiment of the invention, the user may choose to log the status notifications for review at a later time. Because status notifications typically occur on a transient basis, and the popup alerts are displayed for a preset or programmable amount of time, unless the user is viewing the display screen at the time of the popup, the alert may be missed. The log simply records the status notifications for the user and may be selected in combination with or in lieu of the popup alerts. The logged entries may provide the user with a similar set of call handling options as previously discussed but may include considerations for current condition of the endpoint.

Another optional feature of an endpoint status notification of the invention includes setting authorization levels to users. In this manner, a system administrator, or the like, can grant certain privilege levels to users for call control processing. For instance, certain users may not be authorized to place toll calls, so a "call" option may not be provided to that user if toll charges will accrue.

Figure 5E:
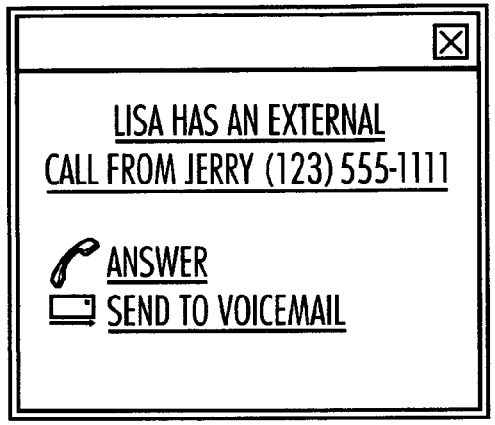
Figure 5F:
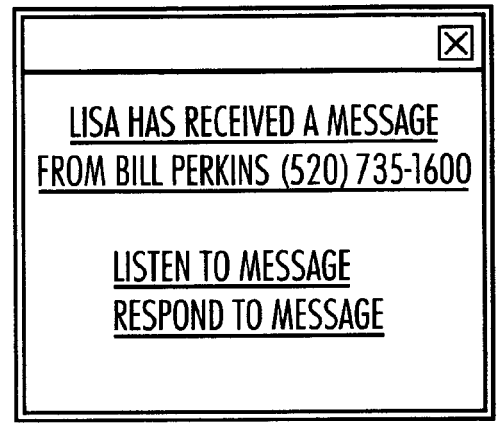

FIGS. 5E and F illustrate another aspect of the invention. As previously mentioned, it is useful to use the status notification alerts as a way to cover calls for others when they are out of the office or otherwise unavailable. Proxy-like authorization can be used to permit other users to receive status notifications on behalf of a user. Alternatively, the user as well as any proxy users may receive the same notifications. This feature is especially useful for secretaries and administrative assistants who may be responsible for handling calls and messages on behalf of others. In this manner, the secretary can be notified of an incoming call to the user and in a sense, "screens" the call for the user. For example, the status notification shown in FIG. 5E indicates, "Lisa has an external call from Jerry (123) 555-1111.", This notification can be viewed at the user's device, the proxy's device, or optionally linked to an audio signal. In this sense, the proxy can respond to the call with various call control commands on behalf of the user. In a similar sense, the status notification of FIG. 5F indicates, "Lisa received a message from Bill Perkins (520) 735-1600" and permits the proxy and/or the user to perform various call control commands on behalf of the user. In the last example, the call control commands provided include "Listen to message," such as a voice message, and "Respond to message," such as return the call to Bill.

Figure 5G:
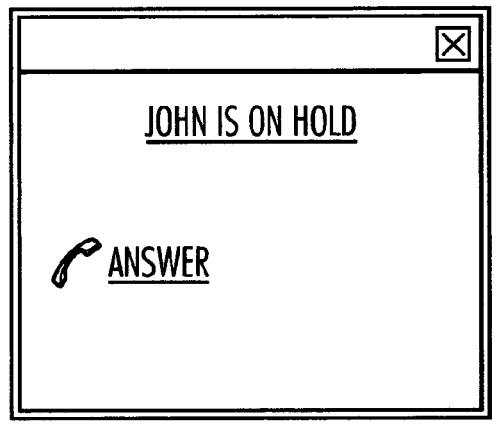
Figure 5H:
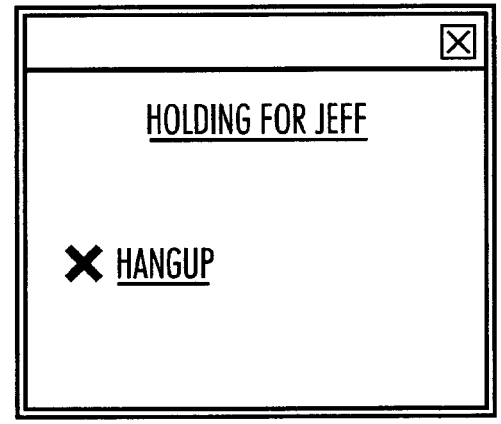

Yet another optional feature of the invention provides notification when a user is on hold or places a call on hold. For example, FIGS. 5G and H illustrate various embodiments of call-on-hold and holding features. FIG. 5G may be useful when a user places a current call on hold, i.e., "John is on hold", to answer another call ringing in, or the like. The status notification may indicate a reminder to the user that he has placed a call on hold. FIG. 5H may indicate that the user has been placed on hold by another user, i.e., "Holding for Jeff." In accordance with the various aspects of the invention, call control options may be provided to the user that are related to the current feature, such as "hangup" if the user has been holding too long.

It should be appreciated that the exemplary status notifications provided in the above figures are not intended to be limiting in display or textual content. Rather, these examples are provided to fully understand the diversity of a status notification system of the invention and disclose a preferred embodiment. Certainly one skilled in the art will readily recognize various other notification means and textual options which fall within the scope of the present invention.

In another embodiment of the invention, a reportable event triggers a notification when a system-wide or node-wide failure occurs. As previously described, reportable events are generally linked to changes in the user's or the user's speed dial list status. Because a system failure affects the status of the user and the contacts in the user's speed dial list, this can be considered a reportable event. As an example, the user may receive system popup alerts such as, "Node X has gone down" or "Server Failure," to name a few.

The various operations of the present invention will now be discussed to further facilitate understanding of the invention and its best mode. It should be appreciated that the particular implementations shown and described are illustrative of embodiments of the invention (including its best mode) and are not intended to limit the scope of the present invention in any way. It should be appreciated that additional steps may occur that are not represented on the following flowcharts but are discussed in the conjoining text or elsewhere herein (e.g., establishing a speed dial contact list). Moreover, there may be operations, functions, routines, and the like that are not depicted on the flows or elsewhere but are well understood in the industry as common actions for a telecommunications system.

Figure 6:
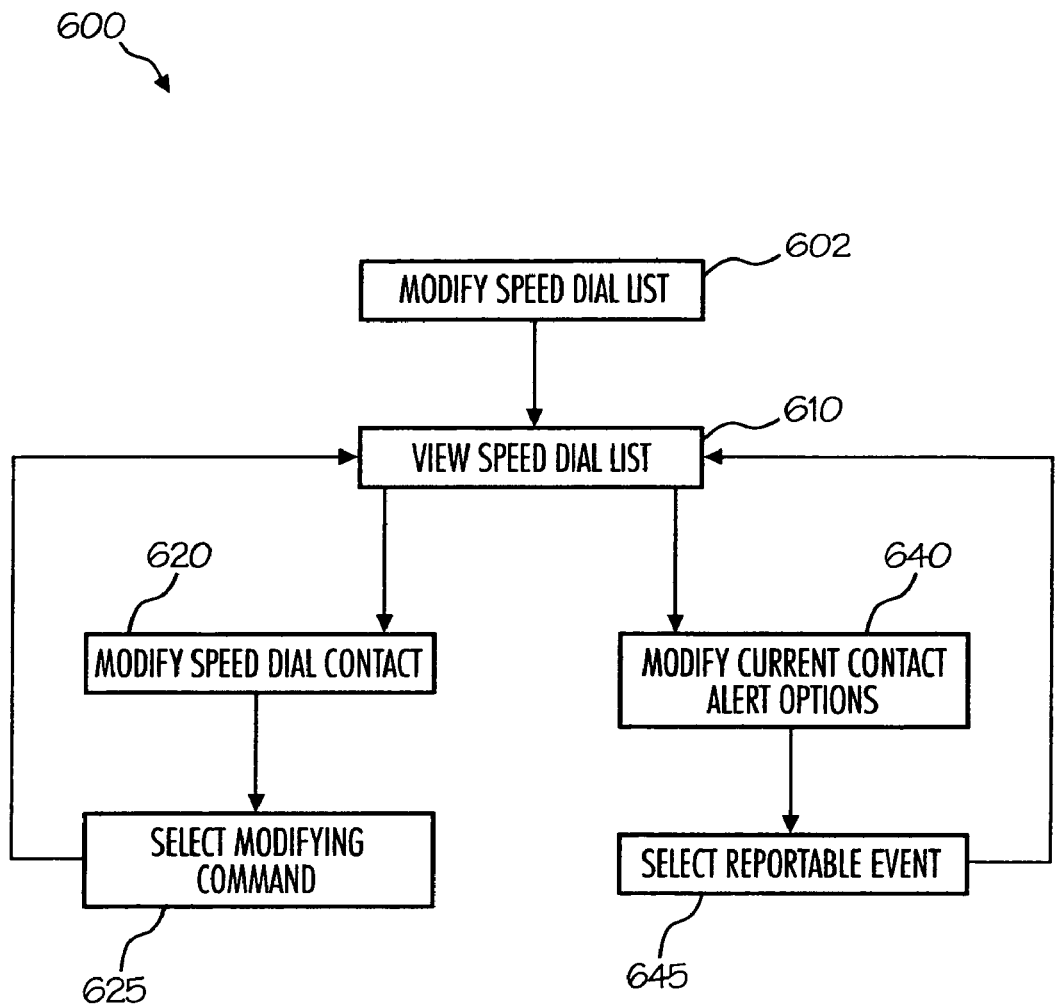
FIGS. 6 and 7 are flowcharts of exemplary operations of an endpoint status notification system in accordance with the invention.

FIG. 6 is a flowchart 600 of the operation of an endpoint status notification system (e.g., exemplary system 100) in accordance with one embodiment of the invention. In particular, flowchart 600 generally describes the operations of modifying a speed dial contact list. Assuming that the user has properly established a speed dial contact list, or the equivalent, from time to time, a user may wish to modify the speed dial list (step 602). System users may be added, deleted or their name changed on the list. Similarly, contacts may add additional devices that the user discovers during a periodic browse of the system's address book or by some other means. At any rate, the user typically views his current speed dial contact list prior to making any modifications (step 610). In general, the user may modify the contact list itself (step 620) or modify an existing contact (step 640). If the user desires to modify the speed dial contact list, the user selects the modifying command, e.g., "add a contact," "delete a contact," (step 625). If, for example, the user desires to add a contact to the speed dial list, the user may browse the personal contact list or system address book and select the contact to add. Alternatively, the user may use a "search" function to find the contact and then add the user. If the user chooses to delete a speed dial contact, the contact's status changes will no longer be reported to the user. Optionally, when the user selects to delete a contact, the contact is removed from both the user's speed dial list and the user's personal contact list. Once the user's commands are processed, the updated speed dial list may be displayed for the user to verify the operation occurred (step 610).

Another modification to the speed dial list may be to modify a contact currently listed on the user's speed dial list (step 640). As previously mentioned, the user can set the level of notification for each contact on the user's speed dial list by selecting the desired reportable events (step 645). In one particular embodiment, the user may "right click" on the contact in the speed dial list and a window of available options is displayed. Alternatively, the system may include default reportable events if the user chooses not to customize the status notifications for the contact. The system saves the selected updates to the contact and may return the user to the updated speed dial list (step 610).

In one respect, the above flowchart represents user-generated or user-induced changes to the speed dial list. Keeping in mind that preferably an endpoint status notification system of the invention reacts only when changes occur, the system will react accordingly when the user modifies his personal speed dial list. Other changes cause the system to react that are not user-generated, but are contact or system generated. These will be discussed in the following flowchart.

Figure 7:
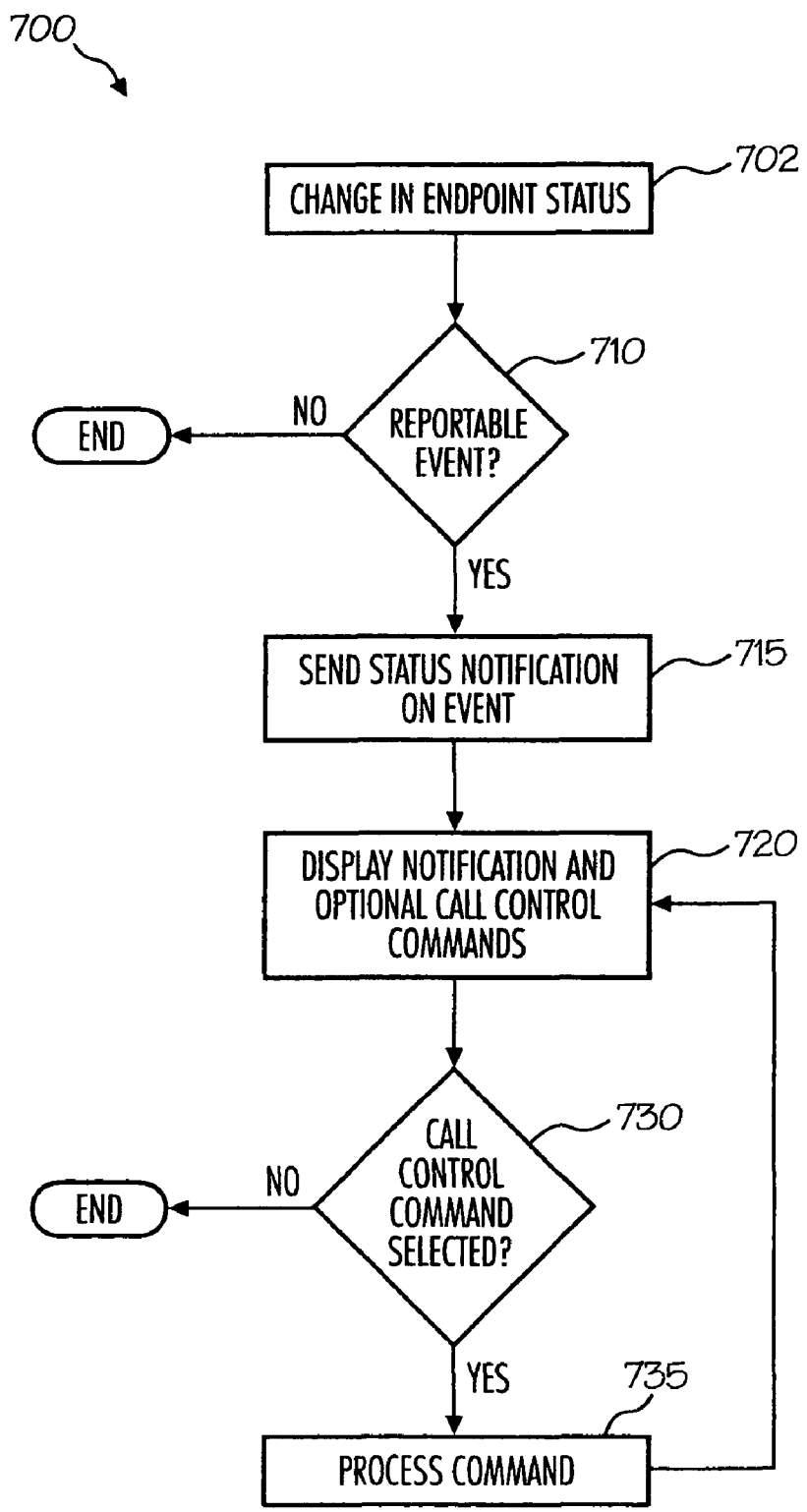

FIG. 7 is a flowchart 700 of the operation of an endpoint status notification system (e.g., exemplary system 100) in accordance with another embodiment of the invention. In particular, flowchart 700 generally describes the operations when a change in endpoint status is detected by the system. Again assuming that the user has properly established a speed dial contact list, or the equivalent, the system continues to monitor the status of the associated endpoints on the list as well as the user's endpoint. Preferably, an endpoint status notification system of the invention alerts the user of reportable events occurring for watched contacts, including the user. In this manner, the system recognizes when a change in status has occurred, e.g., to a speed dial contact or the user, (step 702).

Many status changes occur in a typical telecommunication system, however preferably an endpoint status notification system of the invention determines whether the change is a "reportable event" (step 710). Recall that a reportable event is a change in endpoint status that triggers a status notification to the user. Reportable events can be set by the user and may be customized for each contact on the user's speed dial list. In addition, reportable events may be system-wide events occurring that affect the user, some, or all of the speed dial contacts. Furthermore, reportable events may be notifications for the user only, such as an incoming call, a message, etc. The system determines if the status change is a reportable event and if not, does nothing further to notify the user.

If the change in endpoint status is a reportable event, then the system sends an appropriate status notification to the user indicating the details of the event, such as the name of the contact and the reportable event (step 715). In the preferred embodiment, as disclosed herein, the status notification is a popup alert appearing on the user's display akin to an instant message. Thus, the system displays the status notification (e.g., a popup alert window) on the user's logged in device and, if applicable, with one or more optional call control commands (step 720). Preferably, the status notifications disappear from the display after a very short time. Alternatively, the user may choose not to display the notifications in real-time but log them for future review.

The call control commands provide the user a means to immediately perform a call function related to the received status notification. For instance, if the status notification stated, "Jeff's status has changed to Available," then the user may have the option to call Jeff immediately by selecting the "Call" option on the notification. Depending on the user's display device and associated endpoint, the user may simply click on the command option and communicate with Jeff via the microphone/speaker of a personal computer, associated keyset, or both. If the system detects a call control command has been selected (step 730), then the command is processed for the user (step 735). Some commands, such as "call" will trigger another status notification to be displayed along with more optional call control commands (step 720) and the cycle continues until no more commands are selected.

Presented herein are various systems, methods and techniques for endpoint status notification, including the best mode. Having read this disclosure, one skilled in the industry may contemplate other similar techniques, modifications of structure, arrangements, proportions, elements, materials, and components for notifying users of reportable events in monitored endpoints that fall within the scope of the present invention. These and other changes or modifications are intended to be included within the scope of the present invention, as expressed in the following claims.

The invention claimed is:

1. An endpoint status notification system for use in a telecommunications network, the system comprising:
   an address book comprising a plurality of network user's names and their associated endpoints;
   a personal list of contacts comprising the users selected from the address book by one of the users;
   an instant message alert received by said one user upon every occurrence of a reportable event for the contacts on the list, the alert comprising one of a plurality of viewable informational status messages pertaining to the contact and delivered to said one user unbeknownst to the contact, the reportable event being selected by said one user for each of the contacts on the list, whereby the reportable events received by said one user may differ for each of the contacts on the personal list; and
   a viewable call-control option received by said one user simultaneous with the instant message alert and selection of said option causes a telecommunication function related to the reportable event and pertaining to the contact to immediately occur.

2. The system of claim 1, wherein said instant message alert comprises a popup window on a display of an endpoint of said one user.

3. The system of claim 1, wherein said one user proxies another user to receive the instant message alerts intended for said one user.

4. The system of claim 1, wherein one of the contacts on the personal list comprises said one user, thereby said one user receiving the instant message alert for every occurrence of a reportable event for said one user.

5. The system of claim 1, wherein the instant message alert is received for a preset amount of time to be determined by said one user.

6. The system of claim 1 further comprising a log of the reportable events for said one user and viewable by said one user sometime after the event occurs.

7. The system of claim 1, wherein the personal list of contacts further comprises a textual display of a current status of the contacts, the list being viewable by said one user and updated immediately following a reportable event, whereby said one user is able to view a real-time status of the contacts.

8. A method of endpoint status notification system in a telecommunications network comprising a plurality of users, the method comprising:
   selecting a list of personal contacts from an address book comprising names and endpoints belonging to the users;
   for each of the contacts, choosing one or more telephony-related reportable events associated with the contact, whereby the reportable events for each contact may differ;
   receiving a message alert instantaneously upon occurrence of the telephony-related reportable event and transmitted unbeknownst to the contact;
   viewing the alert comprising an informational message and a call-control option, both pertaining to a real-time status of one of the contacts;
   selecting the call-control option to initiate a telephony-related function to the contact.

9. The method of claim 8, wherein viewing the alert comprises viewing a popup window for a pre-determined time limit.

10. The method of claim 8 further comprising viewing a menu of telephony-related reportable events for each contact prior to choosing the reportable events.

11. The method of claim 10 further comprising viewing the list of personal contacts and a real-time status of each contact displayed near each name.

12. A method for status notification in a telecommunications network comprising a plurality of endpoints, the method comprising:
   detecting a change in status of a monitored endpoint;
   determining if the change is an identified reportable event for the monitored endpoint;

if the change is the identified reportable event, then immediately transmitting a status alert to a user, unbeknownst to the monitored endpoint, requesting notification of the identified reportable event;

transmitting, simultaneous with the status alert, one or more viewable call processing commands related to the identified reportable event and the monitored endpoint; and processing the call command associated with the monitored endpoint.

13. The method of claim 12, wherein determining comprises comparing the change to a pre-selected and stored reportable event for the monitored endpoint.

14. The method of claim 12, wherein transmitting a status alert comprises transmitting and displaying a popup window.

15. The method of claim 12, further comprising causing an audible alert to indicate the identified reportable event.

16. The method of claim 12, wherein reportable events vary for each monitored endpoint.

* * * * *